A. B. HURLEY.
COMBINED HOSE CLAMP AND SUPPORT.
APPLICATION FILED APR. 23, 1915.
1,274,717.
Patented Aug. 6, 1918.
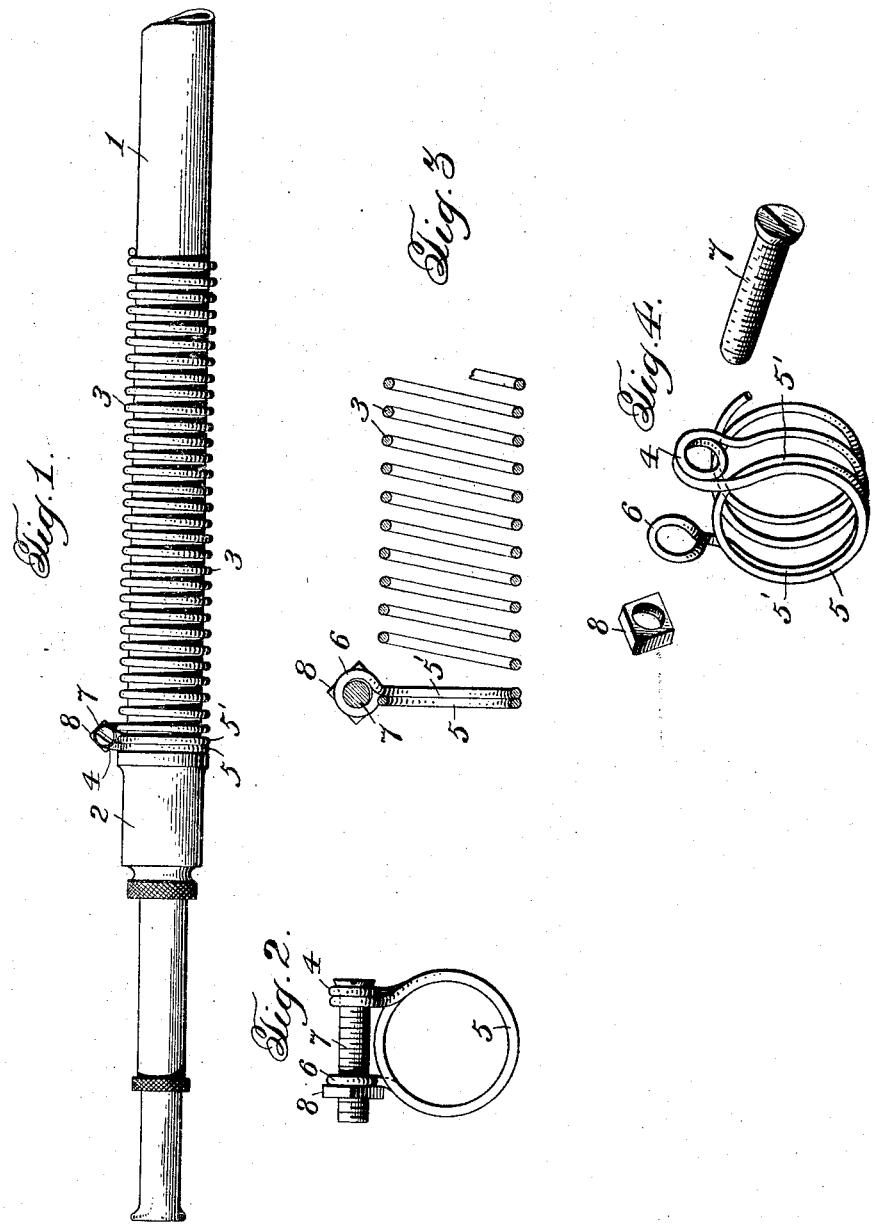

UNITED STATES PATENT OFFICE.

ALBERT B. HURLEY, OF SEAFORD, DELAWARE, ASSIGNOR OF ONE-HALF TO LUTHER W. HURLEY, OF SEAFORD, DELAWARE.

COMBINED HOSE CLAMP AND SUPPORT.

1,274,717.   Specification of Letters Patent.   Patented Aug. 6, 1918.

Application filed April 23, 1915. Serial No. 23,318.

*To all whom it may concern:*

Be it known that I, ALBERT B. HURLEY, a citizen of the United States, residing at Seaford, in the county of Sussex and State of Delaware, have invented certain new and useful Improvements in Combined Hose Clamps and Supports, of which the following is a specification, reference being had therein to the accompanying drawing.

This invention relates to a combined hose clamp and support or guard, and has for its primary object the provision of a device of this character wherein a hose, such for instance as the ordinary garden hose, may be reinforced and protected against breakage, at the connection,—that is to say,—where the hose is secured to the coupling for connecting said hose to a source of fluid supply, or at the end of the hose where the usual nozzle is mounted; thereby effectually preventing the buckling or short-bending of the hose at such points during usage of the same, and thus increasing the life of the hose.

A further object of the invention is to provide a device of this character for firmly and securely fastening the coupling or nozzle to the hose, and also affording a hand hold at such points and especially at the nozzle end of the hose.

A still further and important object of the invention is to provide a device of this type which can be formed from a single length of resilient wire to form a combined clamp and support for the hose, said clamp being made up of a plurality of coils or loops, so that at least one of the loops of wire entirely encircles the hose and when drawn tight around the same is adapted to clamp said hose firmly at all points around the coupling or nozzle, as the case may be.

A still further object of the invention is to so construct the clamp that the eye bearing loop will be coiled or bent into a position where it lies between two adjacent coils of the device, thereby locking said loop firmly in place and effectually preventing the coils or loops of the clamp from pulling apart. It is to be noted that in this manner the two bolt eyes will assume a position diametrically opposite one another, and this without requiring any sidewise bending of the free end of the terminal loop.

With these and other objects in view, the invention consists in the construction, combination and arrangement of parts, as will be hereinafter more fully described and claimed.

In the drawings:—

Figure 1 is a side elevation of the nozzle end of a hose with a device, constructed in accordance with my invention, applied thereto:—

Fig. 2 is an end elevation of the clamp end of the device;

Fig. 3 is a longitudinal sectional view of the device, and

Fig. 4 is a perspective view of the clamp and its associated parts.

Referring to the drawings, 1 denotes a portion of a garden hose and 2 the nozzle, which is of the ordinary and well known construction, said nozzle having the usual coupling sleeve at the end thereof to receive one end of the hose, and about which said hose is securely clamped by means of the device hereinafter more fully described.

The device is formed from a single length of resilient wire and comprises a convoluted portion 3, and at one end of this convoluted portion the wire is bent back upon itself to form a bolt receiving eye 4, a plurality of loops or coils 5, 5', and a second bolt receiving eye 6, formed at the free end of the loop 5', all of said parts, namely those denoted by numerals 4, 5, 5' and 6 constituting a clamping member for use as herein described.

The bolt receiving eyes 4 and 6 are arranged in alining relation, one with the other, and are adapted to receive a bolt 7, carrying a nut 8, serving as a means for drawing the eyes 4 and 6 toward each other, tightening the coils or loops of the clamp and thereby firmly and securely binding said clamp about the hose.

It is to be particularly noted that the clamping member is made up of a plurality of coils or loops, two being shown in the present instance, so that at least one coil or loop completely encircles the hose when applied thereto, and when drawn tight around the same is adapted to clamp said hose and exert an equal pressure thereon at all points about the coupling or nozzle. In this manner a water tight connection between the coupling or nozzle and the hose is assured.

The eye bearing loop, which is indicated at 5', is coiled or bent in such a manner as to assume a position between the clamping loop 5 and the first coil of the convoluted portion 3 at the clamp end of the device, whereby said terminal loop is firmly located and held in place behind the loop or coil 5, effectually preventing the coils or loops of the clamp from pulling apart.

Furthermore, by so locating the eye bearing loop as above referred to, both bolt receiving eyes 4 and 6 are thereby brought into alining or opposed relation, which obviates the necessity of sidewise bending of the free end of said loop, which would otherwise be required.

The device is applied externally on the hose so that the convolutions will surround the hose, the length of the device being variable, and when surrounding the hose will protect it from short bending or buckling, thereby obviating the breaking of the hose during its use.

The device also serves as a hand-grip to permit of convenient manipulation thereof when watering lawns or otherwise using the hose. The bolt eyes 4 and 6 are formed from the single length of wire, and are arranged as above described to receive the bolt therein, it being noted that by adjusting the nut on the bolt the clamping loops 5 and 5' will bind the hose tightly against the coupling sleeve of the nozzle or other connection, thereby securely and firmly fastening it to the hose. This device is adapted for use on the hose at any point where connections are mounted therein and materially reinforces the hose and avoids leakage at said points of connection and also adjacent thereto.

While I have shown and described in some detail a specific embodiment of the invention, well adapted for application to a hose in a manner as herein set forth, it will be apparent that many changes in details of construction might be made without departure from the spirit of my invention and within the scope of the appended claims.

I claim:—

1. A combined hose clamp and support comprising a spiral supporting member constructed of a single strand of wire and bent at one terminal thereof to provide a clamping member in the form of a loop, the free end portion of the strand of wire forming said clamping member or loop being firmly held and lying behind a coil or loop of the device, and means for clamping the device in position upon a hose.

2. A combined hose clamp and support comprising a spiral supporting member constructed of a single strand of wire and bent back upon itself adjacent one terminal thereof to form a bolt receiving eye and a clamping member made up of a plurality of coils or loops, the eye bearing loop thereof being so formed and located as to lie behind an adjacent coil or loop, a second opposed bolt receiving eye formed at the free end of the terminal loop, and a bolt engaging within the eyes for clamping the device in position upon a hose.

3. A combined hose clamp and support comprising a spiral supporting member constructed of a single strand of wire and bent at one terminal thereof to provide a clamping member made up of a plurality of coils or loops, at least one coil of which is adapted to completely encircle the hose, and a coil so bent as to have the free end portion of the strand of wire from which the same is formed positioned and firmly held between convolutions of the device, and means for fastening the device in position upon a hose.

4. A combined hose clamp and support comprising an elongated spiral or convoluted supporting member constructed of a single strand of wire and bent back upon itself adjacent one terminal thereof to form a double clamping loop and a bolt receiving eye, the eye bearing convolution of said double loop being firmly held behind the first convolution thereof, and a second opposed bolt receiving eye formed at the free end of said double loop, and means for clamping the loop upon a hose.

In testimony whereof I affix my signature in presence of two witnesses.

ALBERT B. HURLEY.

Witnesses:
 JESSE T. SHARPE,
 CHAS. M. HOLLIS.